United States Patent
Marsh et al.

(10) Patent No.: US 11,927,177 B2
(45) Date of Patent: Mar. 12, 2024

(54) EXTRACTING GEOTHERMAL ENERGY FROM THIN SEDIMENTARY AQUIFERS

(71) Applicant: Geothermal Technologies, Inc., Bel Air, MD (US)

(72) Inventors: Bruce D. Marsh, Hunt Valley, MD (US); Saman Karimi, Baltimore, MD (US)

(73) Assignee: Geothermal Technologies, Inc., Bel Air, MD (US)

( * ) Notice: Subject to any disclaimer, the term of this patent is extended or adjusted under 35 U.S.C. 154(b) by 0 days.

(21) Appl. No.: 17/459,438

(22) Filed: Aug. 27, 2021

(65) Prior Publication Data

US 2023/0062942 A1 Mar. 2, 2023

(51) Int. Cl.
 F03G 4/00 (2006.01)
 F24T 10/00 (2018.01)
 F24T 10/20 (2018.01)

(52) U.S. Cl.
 CPC ............. F03G 4/072 (2021.08); F03G 4/026 (2021.08); F03G 4/033 (2021.08); F24T 10/20 (2018.05);
 (Continued)

(58) Field of Classification Search
 CPC ...... F03G 7/04; F03G 7/045; F03G 4/00–074; Y02E 10/10; F24T 10/20
 See application file for complete search history.

(56) References Cited

U.S. PATENT DOCUMENTS

| 4,319,635 A | 3/1982 | Jones |
| 11,644,220 B1 * | 5/2023 | Marsh ..................... F24T 50/00 165/45 |

(Continued)

FOREIGN PATENT DOCUMENTS

| CN | 105840146 A | * | 8/2016 | |
| CN | 107461603 B | * | 10/2019 | ............. F01D 15/10 |

(Continued)

OTHER PUBLICATIONS

C.J.L. Willems, H.M. Nick, T. Goense, D.F. Bruhn, "The impact of reduction of doublet well spacing on the Net Present Value and the life time of fluvial Hot Sedimentary Aquifer doublets", Geothermics, vol. 68, 2017, pp. 54-66, ISSN 0375-6505, https://doi.org/10.1016/j.geothermics.2017.02.008. (Year: 2017).*

(Continued)

*Primary Examiner* — Laert Dounis

(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for using a thin-bed hot sedimentary aquifer (HSA) in geothermal energy generation applications. An example embodiment operates by pumping, via an extraction well, heated water from an extraction depth of an HSA. The HSA is identified based on a permeability satisfying a threshold permeability range and could even have a thickness equal to or less than about 100 meters. The example embodiment further operates by extracting, via a power generation unit, heat from the heated water to generate power and transform the heated water into cooled water. Subsequently, the example embodiment operates by injecting, via an injection well, the cooled water at an injection depth of the HSA. A first portion of the extraction well and a second portion of the injection well are disposed within the HSA.

25 Claims, 8 Drawing Sheets

(52) U.S. Cl.
CPC ....... *F24T 2010/53* (2018.05); *F24T 2010/56* (2018.05); *F24T 2201/00* (2018.05); *Y02E 10/10* (2013.01)

(56) References Cited

U.S. PATENT DOCUMENTS

| | | |
|---|---|---|
| 2006/0137349 A1 | 6/2006 | Pflanz |
| 2011/0041500 A1 | 2/2011 | Riley |
| 2012/0001429 A1 | 1/2012 | Saar et al. |
| 2012/0018120 A1* | 1/2012 | Danko .................... F24T 10/20 165/45 |
| 2015/0300327 A1* | 10/2015 | Sweatman .............. E21B 43/25 60/641.2 |
| 2015/0354859 A1 | 12/2015 | Marsh et al. |
| 2017/0211849 A1 | 7/2017 | Muir et al. |
| 2020/0191444 A1 | 6/2020 | Nevison et al. |

FOREIGN PATENT DOCUMENTS

| | | | | |
|---|---|---|---|---|
| SU | 1633237 A1 * | 3/1991 | | |
| WO | WO-2013067570 A1 * | 5/2013 | ................ | C02F 1/60 |
| WO | WO-2014148924 A1 * | 9/2014 | ............ | E21B 43/26 |
| WO | WO-2018206773 A1 * | 11/2018 | ............... | F03G 7/04 |
| WO | WO-2021167701 A1 * | 8/2021 | | |

OTHER PUBLICATIONS

International Search Report and Written Opinion of the International Searching Authority directed to related International Patent Application No. PCT/US2022/075439, dated Sep. 23, 2022; 14 pages.

* cited by examiner

600

602
DETERMINING, ACCORDING TO A GEOTHERMAL CHARACTERISTIC OF A HOT SEDIMENTARY AQUIFER (HSA) BELOW A SURFACE LOCATION THAT SATISFIES A THRESHOLD ASSOCIATED WITH PROVIDING GEOTHERMAL ENERGY, AN EXTRACTION DEPTH FOR AN EXTRACTION WELL DISPOSED TO EXTRACT HEATED WATER FROM THE HSA AND AN INJECTION DEPTH FOR AN INJECTION WELL DISPOSED TO INJECT COOLED WATER INTO THE HSA THAT IS GENERATED FROM A HEAT EXTRACTION PROCESS ASSOCIATED WITH CAPTURING GEOTHERMAL ENERGY

604
CONFIGURING A GEOTHERMAL SYSTEM IN ASSOCIATION WITH THE SURFACE LOCATION TO EXTRACT THE HEATED WATER FROM THE HSA AT THE EXTRACTION DEPTH

606
CONFIGURING THE GEOTHERMAL SYSTEM TO INJECT COOLED WATER INTO THE HSA AT THE INJECTION DEPTH

702
PUMPING, VIA AN EXTRACTION WELL, HEATED WATER FROM AN EXTRACTION DEPTH OF A HOT SEDIMENTARY AQUIFER (HSA)

704
EXTRACTING, VIA A POWER GENERATION UNIT, HEAT FROM THE HEATED WATER TO GENERATE POWER AND TRANSFORM THE HEATED WATER INTO COOLED WATER

706
INJECTING, VIA AN INJECTION WELL, THE COOLED WATER AT AN INJECTION DEPTH OF THE HSA

FIG. 7

EXTRACTING GEOTHERMAL ENERGY FROM THIN SEDIMENTARY AQUIFERS

BACKGROUND

Geothermal heat is an excellent source of renewable energy as the Earth's temperature naturally increases with depth. Although there are many geothermal energy facilities around the world, these facilities are typically located in places with volcanic activity, which provide a high temperature, easily accessible resource for energy harvesting. Unfortunately, these volcanic regions are geographically limited. Hot dry rock is another potential source of geothermal energy, but nearly all projects attempting to harvest heat in this manner have failed. Hot sedimentary aquifers are widespread and represent a new, promising, and very economical source for geothermal energy production.

BRIEF DESCRIPTION OF THE FIGURES

The patent or application file contains at least one drawing executed in color. Copies of this patent or patent application publication with color drawing(s) will be provided by the Office upon request and payment of the necessary fee.

The accompanying drawings are incorporated herein and form a part of the specification.

FIG. 6 is a flowchart illustrating a process for configuring a geothermal system, according to some embodiments.

FIG. 7 is a flowchart illustrating a process for harvesting heat from a thin-bed hot sedimentary aquifer (HSA), according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
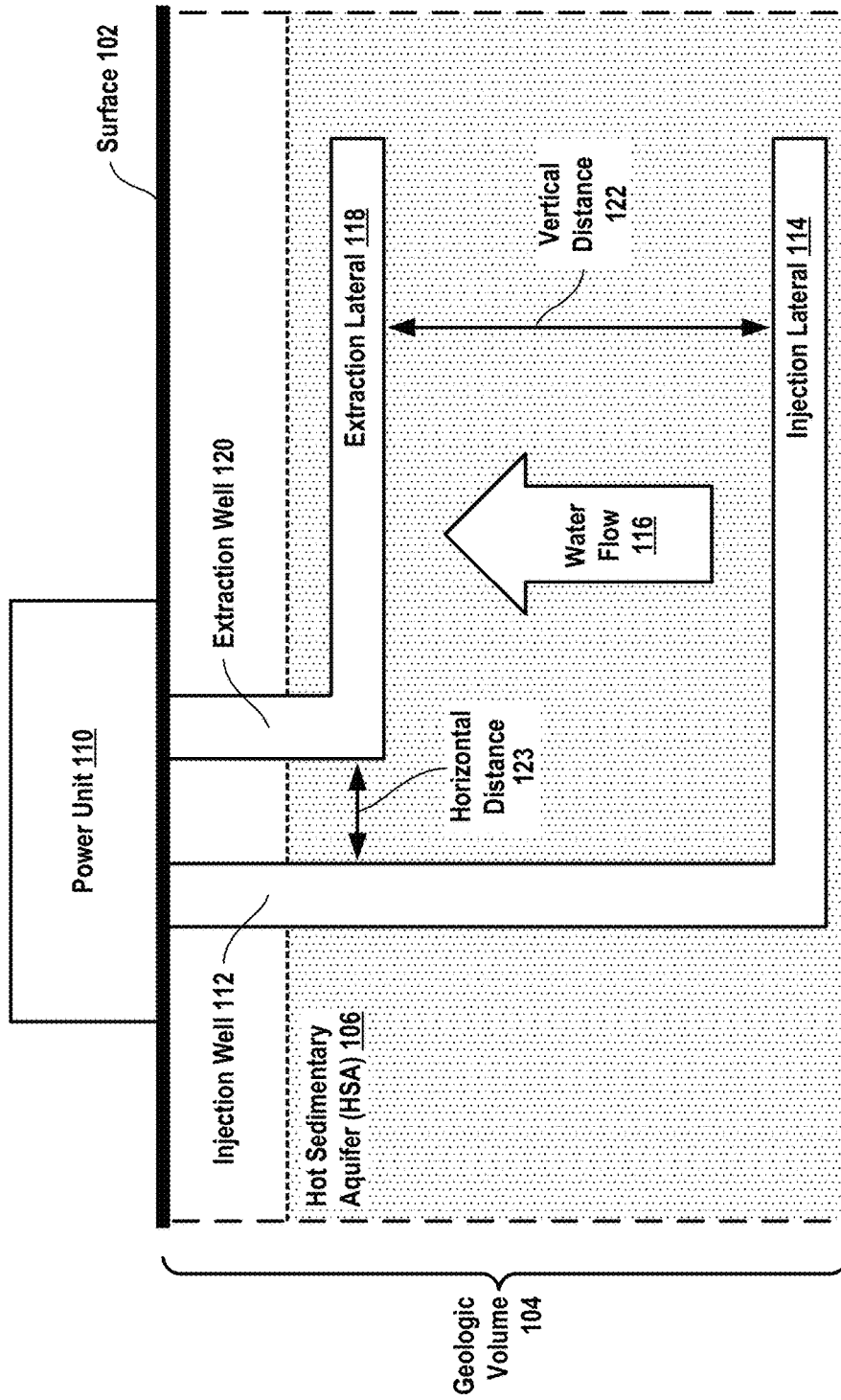
FIG. 1 is a schematic diagram of an example natural geothermal system, according to some embodiments.

Fossil fuels (or hydrocarbons) are the primary source of energy for the world today, and they present two major problems. First, fossil fuel resources are not renewable, meaning that there is a finite amount of them on our planet. Second, using fossil fuels produces carbon dioxide ($CO_2$), the major greenhouse gas and the main driver of the Earth's atmosphere warming. With the ever-increasing population on Earth, the need for newer, renewable and clean sources of energy is more evident than ever before. In contrast to fossil fuels, geothermal energy has the potential to provide an infinite amount of clean energy, with no carbon footprint. In contrast to other renewable energies, geothermal energy is constantly available and is the best candidate for providing baseload power. The earlier inefficient designs of geothermal plants, for a number of reasons, were not able to provide a worldwide commercial level of energy extraction from this infinite source of energy beneath our feet. The current locations of geothermal plants are geographically biased, and only extract energy almost exclusively in the proximity of volcanic regions from naturally-occurring, geyser-like hydrothermal systems. Thus, while geothermal energy has a massive potential, the share of such energy in the global energy market is minute.

In one example, geothermal energy can have two main applications: direct use (e.g., heat generation); and power generation. However, as described above, geothermal energy extraction is primarily restricted to seismically and volcanically active regions such as in the western United States. Extracting energy from other parts of Earth's continental crust (e.g., seismically non-active regions) can be expensive, non-economic, and short-lived. Some geothermal systems, known as enhanced geothermal systems (EGS), generate man-made hydrothermal reservoirs through artificial fracking methods. These geothermal systems can be constructed in hot dry rock (HDR) that are commonly found at sufficiently great depths below the surface such that high enough temperatures are encountered. Constructing an EGS in HDR involves drilling into the HDR and creating an artificially made reservoir through fracturing. Fracturing, however, is a complex and expensive engineering task that requires a substantial amount of equipment (e.g., hardware resources, environmental resources, computing resources, etc.) and is ecologically and environmentally damaging.

Artificially constructed fractured reservoirs can be designed to contain an extensive plexus of fractures through which fluid flow is facilitated horizontally and/or randomly and without obstruction. Under such geothermal systems, water from an injection well is made to flow to and through the artificially fractured reservoir, where it becomes heated and then is pumped back up to the surface to the energy conversion unit via the extraction well. As such, the thermal energy of the water is transferred from the hot solid rock through thermal conduction. The efficiency of these conventional geothermal systems is limited because the thermal diffusivity of rock is low. As the waters heat up, the associated rock must proportionally cool down, and the time for replacing the lost rock-heat is very long. The longevity of such systems is thus relatively short, less than 10 years after which the water temperature rapidly drops below the economic level.

Provided herein are system, apparatus, device, method and/or computer program product embodiments, and/or combinations and sub-combinations thereof, for harvesting geothermal energy on a widespread, global basis using a geothermal convective power cell (GPC) that is created in hot sedimentary aquifers. In some embodiments, the GPC method disclosed herein can include, but is not limited to: (i) inducing a large scale subsurface convection flow field by imposing a dipole pressure gradient through pumping between two or more lateral wells, vertical wells, or both; (ii) pumping hot water from this subsurface system via an extraction well; (iii) extracting heat or thermal energy via an energy conversion unit from the extracted superheated water; and (iv) returning, via pumping, the resultant cooled water to the subsurface through a reinjection well, where it can be reheated, continuing the cycle. The overall induced convective system allows the harvesting of hot waters over a vastly larger area than that simply represented by the distance between the extraction and reinjection wells and over a vastly longer time. Moreover, the lengths and positioning of the coupled lateral extraction and reinjection wells can be styled or crafted to fit any suitable sedimentary formation.

In some embodiments, the present disclosure provides a GPC capable of steadily harvesting economic energy from a wide spectrum of sedimentary aquifers, thick and thin, for many decades. The GPC disclosed herein can be configured to perform operations including, but not limited to, identifying an adequately deep hot sedimentary aquifer (HSA) such that the waters of the porous aquifer are of a sufficiently high-temperature for power generation. If the sedimentary aquifer is sufficiently thick, the location of the injection well can be placed at the bottom of the layer and the location of the extraction well can be placed vertically above the injection well, near the top of the layer. In thin sedimentary layers, which present more challenging situations, the injection and extraction wells may be very nearly at the same depth.

In some embodiments, the present disclosure provides a GPC method of harvesting geothermal energy that includes, but is not limited to, pumping water to and from the sedimentary aquifer via the injection and extraction wells, respectively. This pumping process can be designed to create a pressure field that induces or stimulates a flow field or convection cell within the sedimentary aquifer that generates a relatively large-scale zone of mixing between the subsurface waters with the re-injected pumped waters. Subsequently, the extraction well pumps the now heated water to the surface and into the conversion unit or power station.

In some embodiments, the GPC disclosed herein can include: (a) a pump system; (b) a two-vertical-well system within the subsurface; (c) a two-horizontal-well or two-lateral-well system within an HSA; (d) a sufficiently warm and water-charged sedimentary aquifer; (e) a surface conversion unit; and (f) an adequately large pressure difference between injection and extraction wells in order to generate convection. In some embodiments, the GPC disclosed herein can include: a pumping system (e.g., injection and extraction); an energy conversion unit; and a displaced well system in the hot sedimentary aquifer. The pumping system can be installed on the surface or underground. The pumping system can cause the extraction well to extract hot water from the subsurface and cause the injection well to re-inject cooled water back into the sub surface.

In some embodiments, the present disclosure provides a GPC which specifically utilizes a thin HSA. In the GPC disclosed herein, lateral drilled injection and extraction wells may be vertically disjointed and offset horizontally. More specifically, water (e.g., liquid water, vaporized water, or any other type of water-based fluid) is extracted from the HSA via an extraction well. The water is processed to capture heat from the heated water, resulting in cooled water. The cooled water is then re-injected via an injection well. The imposed pumping pressure field induces a large-scale fluid convection or circulation system in the HSA which continually recharges the geothermal system. As the area between the injection and extraction well becomes larger, an increasingly larger amount of heat is available for harvesting. Thus, the lateral wells of injection and extraction can be offset which allows harvesting heat from a large area. An increase in well spacing may also necessitate a need for larger pumping pressures in the extraction well and/or the injection well. Correspondingly, in contrast with previous EGS systems, the GPC disclosed herein is relatively simplified and inexpensive because it does not involve any artificial fracturing of rock at depth to create a manmade reservoir.

In some embodiments, an HSA is a targeted geothermal reservoir that is sufficiently hot and of almost arbitrary and variable thickness. In order to identify HSAs that have the necessary threshold characteristics to provide an economically desirable amount of heat, specific geologic terrains must be sought through a process of characterization and analysis. Through careful analyses of the desirable geophysical characteristics, the potential efficiency of the formation can be determined. Using the methods and systems described herein, depending on the geothermal characteristics of the HSA, geothermal energy can be extracted for relatively long periods of time (e.g., over 50 years). Installation of a GPC is much easier and cheaper than for any conventional EGS. Additionally, a GPC can be constructed at a vast array of geographically diverse locations on Earth beyond the volcanic regions typically associated with geothermal systems.

In some embodiments, HSAs located in shallow crust, or in regions with insufficient or low background heat fluxes, are generally not be able to produce an adequate amount of geothermal energy for generating power. These HSAs, however, may be suitable for producing water hot enough for direct use in the heating of homes and buildings. Although thicker HSAs may be more suitable for power generation, even thin sedimentary aquifers are capable of producing energy utilizing the GPC disclosed herein, which is suitably well-designed and can be crafted to fit the specific aquifer.

Figure 4:
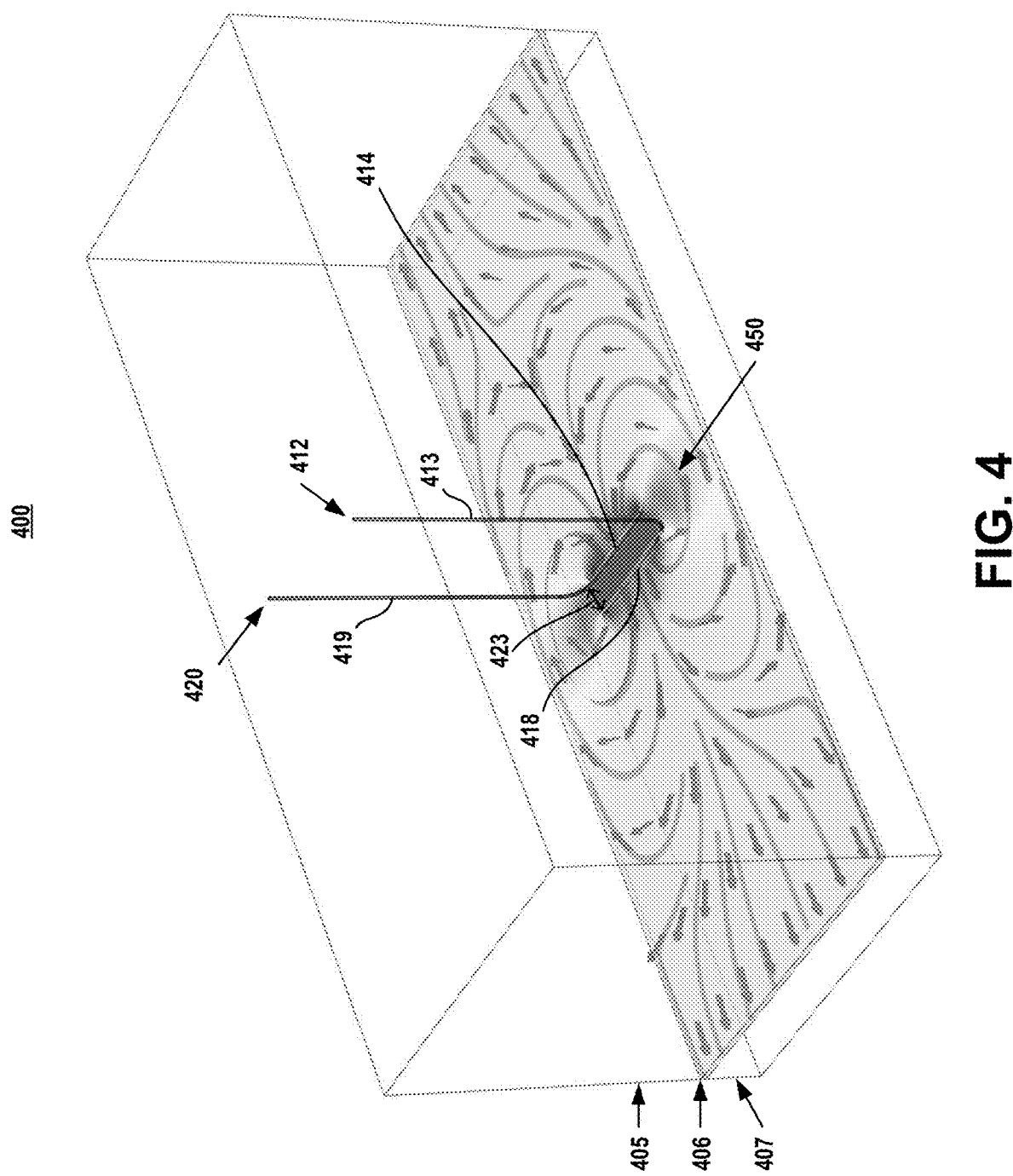
FIG. 4 shows the results of an example numerical simulation of an example NAT-EGS, according to some embodiments.

In some embodiments, the GPC method disclosed herein involves inducing a large-scale convective or flow field within the sedimentary aquifer due to a dipolar pumping pressure field imposed between the injection and extraction wells. Prior to the initiation of pumping, the fluid within the aquifer can have a slow regional flow without substantially any local convective pattern or recirculation system. Upon initiation of pumping, the pattern of fluid flow is soon highly modified in response to the newly established imposed dipolar pressure field of pumping. Under such a scenario, the pumped water becomes heated by both heat conduction and convection. FIG. 4 below shows an exact example of the convective or recirculation field (e.g., the convective recirculation cell 450) found in numerical simulations.

In some embodiments, the present disclosure provides a method that includes pumping heated water, via an extraction well, from an extraction depth of an HSA. The method can further include transferring the heated water to an energy conversion unit, converting thermal energy to electric energy and resulting in cooled water. The method can further include pumping or re-injecting the cooled water, via an injection well, back into an HSA beneath the surface (e.g., this water subsequently can become reheated in the HSA via conduction and convection). The method can further include determining, using comprehensive geologic data analyses, the permeability and/or porosity conditions that satisfy a threshold permeability and/or porosity. The method can further include determining, using comprehensive geologic data analyses, the thermal gradient or heat flux that satisfies a necessary minimum rock temperature of 120 degrees Celsius (° C.). The method can further include generating a dipolar pumping pressure field between the injection and extraction wells, where the dipolar pressure pattern imposes a pattern of fluid recirculation in the sedimentary aquifer, causing continual recharge of the geothermal system. The method can further include determining, using comprehensive numerical modeling, the optimum well configuration (e.g., depth of wells, lateral distance of wells, length of horizontal wells, etc.) from which an economic geothermal system can be constructed.

In some embodiments, the present disclosure provides a GPC method for extracting geothermal energy from thin, hot, and deeply buried sedimentary aquifers called HSAs that satisfy a certain threshold of geothermal characteristics. The GPC method disclosed herein may include extracting hot, superheated water by pumping via an extraction well to the surface, which also may include an energy conversion unit on the surface that extracts energy from the hot water. As a result of this energy conversion unit, the heated water becomes cooled water and is re-injected back into the original HSA beneath the surface. The GPC method disclosed herein may also include establishing a system of fluid convection or recirculation within the thin sedimentary aquifer using a differential pumping pressure between the extraction and re-injection wells. Such convection can be a fundamental feature of the GPC method disclosed herein and can substantially enhance the longevity of the geothermal system, allowing it to persist much longer than other manmade geothermal systems.

Definitions

Unless defined otherwise, all technical and scientific terms used herein can have substantially the same meaning as commonly understood by one of ordinary skill in the art to which the disclosure pertains. The following definitions supplement those in the art and are directed to the current application and are not to be imputed to any related or unrelated case, e.g., to any commonly owned patent or application. The terminology used herein is for the purpose of describing particular embodiments only, and is not intended to be limiting.

As used in this specification and the appended claims, the singular forms "a," "an" and "the" include plural referents unless the context clearly dictates otherwise. Thus, for example, reference to "an attribute" includes a plurality of such attributes, and the like.

The term "about" as used herein indicates the value of a given quantity varies by ±10% of the value. For example, a thickness of "about 500 m" encompasses a range of thicknesses from 450 m to 550 m, inclusive.

Spatially relative terms, such as "beneath," "below," "lower," "above," "on," "upper" and the like, may be used herein for ease of description to describe one element or feature's relationship to another element(s) or feature(s) as illustrated in the figures. The spatially relative terms are intended to encompass different orientations of the element(s) or feature(s) in use or operation in addition to the orientation(s) depicted in the figures. The element(s) or feature(s) can be otherwise oriented (e.g., rotated 90 degrees or at other orientations) and the spatially relative descriptors used herein may likewise be interpreted accordingly.

The term "natural enhanced geothermal system (NAT-EGS)" and "geothermal convective power cell (geo power cell or GPC)" refer to systems for harvesting geothermal energy from hot sedimentary aquifers without hydraulic fracturing by generating convection cells between a production well and an injection well. As used herein, the term NAT-EGS is synonymous with the term GPC.

The term "characteristic" or "geologic characteristic" can refer to a property, such as a rock property or a seismically-determined property, that is present at substantially all locations in the geologic volume (e.g., penetrative). The rock property can include density, porosity, permeability, and other suitable rock properties. The seismically-determined property can include velocity, Young's modulus, and other suitable seismically-determined properties.

The term "permeability" can refer to the various geologic characteristics that form the bulk permeability of a geologic volume, such as an HSA. These geologic characteristics can include, but are not limited to, the permeability of the rock itself, the distribution and degree of existing fractures in the formation, and any new fractures that are induced (e.g., via acid and/or energetics) to increase and/or enhance the bulk permeability of the geologic volume.

In some embodiments, the term "fracture" or "natural fracture" can refer to any non-sedimentary mechanical discontinuity thought to represent a surface or zone of mechanical failure. Chemical processes such as solution and stress corrosion may have played an important role in the failure process. The term "fracture" can be used to describe a natural feature either when available evidence is inadequate for exact classification or when distinction between fracture types is unimportant. In some embodiments, faults are types of fractures. In some embodiments, an "induced fracture" can refer to any rock fracture produced by human activities, such as drilling, accidental or intentional hydrofracturing, core handling, and other activities.

In some embodiments, the term "machine learning" can refer to multivariate-statistics, neural networks, deep neural networks, and other suitable techniques, and any combination thereof. Accordingly, the term "machine learning" as used herein can include all possible correlation methods including multivariate statistics and neural networks.

The term "hot sedimentary aquifer (HSA)" can refer to a sedimentary rock stratum or sequence of strata filled with water (e.g., fresh, saline, or brine) that is sufficiently hot and that has sufficient porosity and permeability to be an economical source of geothermal energy. The term "thin-bed HSA" can refer to an HSA having a thickness equal to or less than about 100 meters.

Example Computing Environment

FIG. 1 is a schematic diagram of an example implementation of an example natural geothermal system 100, according to some embodiments. In some embodiments, the natural geothermal system 100 may be a NAT-EGS configured to extract heat from a thin-bed HSA. In some embodiments, one or more of the operations described below with reference to FIG. 1 may be performed or otherwise carried out by one or more components of the computer system 800.

As shown in FIG. 1, a power unit 110 (e.g., a power plant or other type of geothermal energy processing or utilization facility) associated with the natural geothermal system 100 is positioned on a surface 102 of a location that is above, over, or near a geologic volume 104 that includes an HSA 106. The natural geothermal system 100 includes an extraction well 120 with an extraction lateral 118 and an injection well 112 with an injection lateral 114 that have been drilled to various depths of the HSA 106 and that are either vertically aligned or horizontally separated.

In some embodiments, the power unit 110 may include a pump system, an energy capture unit, an energy conversion unit (e.g., to convert geothermal energy to mechanical energy, electrical energy, any other suitable form of energy, or any combination thereof), and a regulatory device to control the natural geothermal system 100. For example, the regulatory device may control an extraction pump of the pump system to extract water from the HSA 106 via the extraction well 120. In another example, the regulatory device may control the energy capture unit, the energy conversion unit, or both to capture and process geothermal energy from the heated water, resulting in cooled water. In still another example, the regulatory device may control the injection pump to inject the cooled water from the energy capture unit into the HSA 106 via the injection well 112. In some embodiments, the power unit 110 may be configured based on a determined optimum range of water injection rate in the injection well 112 and/or water extraction rate of the extraction well 120 that can produce commercial levels of energy or power. Further, the flow rate of the water (e.g., as indicated by water flow 116) can be tuned (e.g., over time) via pumping adjustments to achieve a best possible efficiency for the natural geothermal system 100 according to the conditions of the HSA 106.

Regarding the terrain of the natural geothermal system 100 (e.g., as indicated by geologic volume 104), the surface 102 may correspond to a ground or soil surface, a water surface (e.g., a lake surface, ocean surface, river surface), or any other suitable type of surface of the Earth. The HSA 106 can be disposed beneath the surface 102 (e.g., beneath the power unit 110) and may include any suitable type of fresh or salt-water bearing sedimentary rock. In some embodiments, the HSA 106 may be configured above and/or between one or more layers of igneous rock.

In some embodiments, the location of the surface 102 may be selected for the power unit 110 based on one or more geothermal characteristics of the HSA 106. For example, the location of the surface 102 may be selected based on determining that the HSA 106 is at a suitable, manageable, and/or accessible depth and includes a sufficient volume of water at a sufficiently high temperature, to determine whether the HSA 106 can efficiently be used to capture geothermal energy from the Earth. The HSA 106 (and/or geothermal characteristics of the HSA 106) may initially be identified and/or analyzed from drilling and sampling the terrain beneath the surface 102. Additionally or alternatively, the HSA 106 may be identified and/or analyzed from seismic imaging data (e.g., mapping data, imaging data, the parameters listed above with reference to the geologic volume parameterization system 130) associated with the terrain beneath the surface 102. The seismic imaging data may be obtained and/or captured in real-time and/or may correspond to historical data associated with previous seismic imaging and/or previously created well bores associated with previous operations, analyses, and/or geological mappings of the terrain beneath the surface 102.

In some embodiments, the geothermal characteristic of the HSA 106 may correspond to one or more characteristics of the HSA 106 that would enable a desired amount of geothermal energy to be extracted from the Earth at a particular rate, for a particular period of time, or both. Such geothermal characteristics may be based on certain physical characteristics of the HSA 106 (e.g., depth, thickness, porosity, permeability, temperature of the HSA 106, and/or pressure and/or composition of water within the HSA 106).

In some implementations, one of the geothermal characteristics of the HSA 106 that may be considered when selecting the location of the surface 102 for the power unit 110, may include a measured or determined heat flow between various depths of the HSA 106. The heat flow may indicate and/or represent an amount of heat or geothermal energy that can be captured from the HSA 106 during a particular time period. The heat flow may be based on the geothermal gradient and determines the temperature of the water at various depths of the HSA 106. Accordingly, the heat flow can be determined (e.g., estimated) based on certain characteristics and/or measurements associated with the HSA 106.

Another geothermal characteristic may include permeability of the HSA 106. The permeability of the HSA 106 may indicate the rate at which water can be extracted from the HSA 106. Correspondingly, in combination with temperatures of the HSA 106 (e.g., at various depths of the HSA 106), the amount of heat or geothermal energy that can be extracted from the HSA 106 can be determined. The permeability of the HSA 106 may be determined based on various tests conducted in the associated drill holes into the HSA 106 and, in some embodiments, further based on the terrain of the HSA 106. According to some implementations, a construction lateral can be drilled between the injection lateral 114 and the extraction lateral 118 to perform an operation to improve the permeability of the HSA 106. For example, such a construction lateral may be drilled and configured to inject acidic water and/or pressurized water (and/or an energetic or propellant, such as an ignitable liquid or solid fuel) to increase the bulk permeability of the HSA 106, thereby improving the permeability between the injection lateral 114 and the extraction lateral 118. In such cases, the permeability of the HSA 106 may satisfy a permeability threshold associated with permitting the construction lateral to be drilled. In some embodiments, such a threshold permeability may be greater than a permeability threshold to use the HSA 106 without performing enhancement operation to increase the permeability of the HSA 106 to configure the natural geothermal system 100.

Similar to permeability, the geothermal characteristic may include or be associated with a porosity of the HSA 106, which can indicate of the volume of water held by the HSA 106. The porosity may indicate or be used to identify the permeability and enable a determination of a flow rate of water through the HSA 106, an amount of water that can be received within the HSA 106 after being processed by the power unit 110 (e.g., to determine an injection rate of a flow of water via the injection well 112).

Such geothermal characteristics may be compared against corresponding thresholds of the geothermal characteristics to determine whether the HSA 106 is suitable for capturing a desired amount of geothermal energy (e.g., corresponding to enough energy to permit the power unit 110 to output a desired amount of power for an area or region of the location of the surface 102) for a desired period of time (e.g., over 50 years). In some embodiments, the thresholds may include a minimum heat flow rate into the HSA 106, a minimum permeability of the HSA 106, a minimum porosity of the HSA 106, any other suitable threshold, or any combination thereof. Additionally or alternatively, certain physical characteristics of the HSA 106 associated with geothermal characteristics of the HSA 106 may be considered (e.g., a minimum or maximum depth of the HSA 106, a minimum or maximum thickness of the HSA 106, a minimum temperature of the HSA 106).

In some embodiments, the natural geothermal system 100 may utilize the HSA 106 that has a sufficiently high background basal heat flux and is sufficiently large enough (e.g., has a sufficient volume, thickness) to supply geothermal energy for fifty years or more. In some locations of the Earth, such an injection depth of the HSA 106 may be at a minimum of 1500 m below the surface 102, and/or such an extraction depth of the HSA 106 may be at a minimum of 1000 m. In such an example, any recirculated water that was injected via the injection well 112 and is extracted via the extraction well 120 reaches the threshold temperature of at least 120° C. For higher levels of basal heat flux, the minimum depth becomes correspondingly less.

In some embodiments, after the location of the surface 102 is selected for the power unit 110, the natural geothermal system 100 may be configured and/or designed according to the characteristics of the HSA 106. For example, as shown, the injection well 112 and the extraction well 120 are a disjointed well system in that heated water is to be extracted from the HSA 106 at an extraction depth and cooled water (which is created from capturing heat from the heated water) is to be injected at an injection depth of the HSA 106. In some embodiments, based on the geothermal characteristics of the HSA 106 and the desired amount of geothermal energy that is to be captured from the HSA 106, the extraction depth and injection depth (and, correspondingly, the vertical distance 122 between the extraction depth of the extraction lateral 118 and the injection depth of the injection lateral 114), as well as the extraction location and the injection location (and, correspondingly, the horizontal distance 123 between the extraction well 120 and the injection well 112), can be determined to provide a desired water flow rate and/or energy extraction rate for a desired period of time that the power unit 110 is to be operable to provide power. As a result, the extraction well 120 and the injection well 112 may be offset laterally, vertically, or both laterally and vertically.

In some implementations, the cooled water can be supplied with a supplemental agent (e.g., a solvent or solute, such as a muriatic acid, hydrochloric acid) to facilitate flow of available water through the HSA 106, as indicated by water flow 116. For example, the supplemental agent, when injected into the HSA 106 via the injection well 112 (along with the cooled water) can increase permeability and/or porosity of the HSA 106 (by causing erosion or breakdown of some of the rock or material of the HSA 106). In this way, the natural geothermal system 100, using the supplemental agent, can improve geothermal energy extraction via the HSA 106.

In some embodiments, geothermal energy can be obtained, by the power unit 110 and from the HSA 106, by pumping heated water from the HSA 106 via the extraction well 120, extracting heat from the heated water to capture energy, resulting in cooled water, and injecting the cooled water back into the HSA 106 via the injection well 112.

Figure 2:
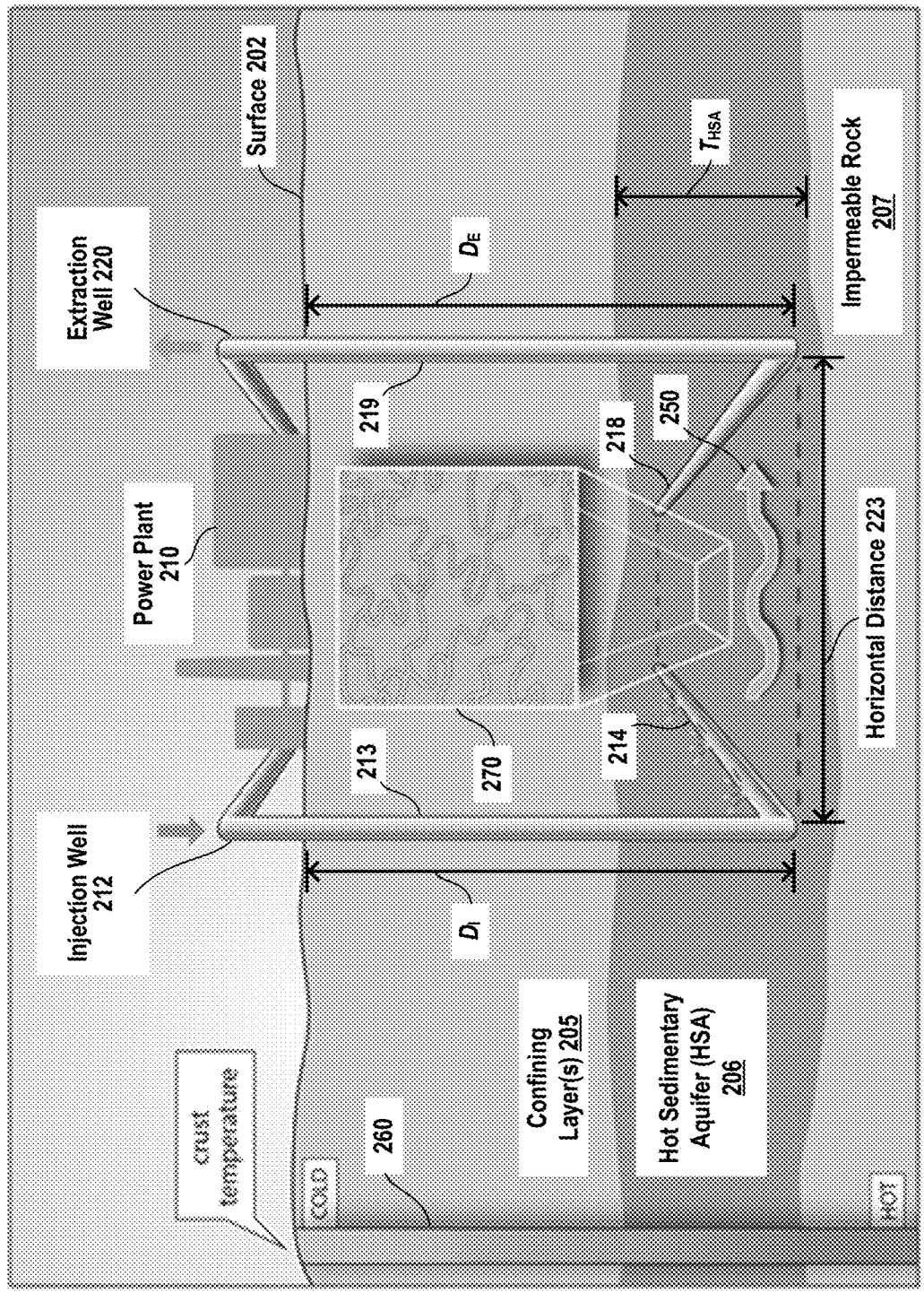
FIG. 2 is a schematic diagram of an example natural enhanced geothermal system (NAT-EGS), according to some embodiments.

FIG. 2 is a schematic diagram of an example implementation of an example NAT-EGS 200 (e.g., a GPC) in a thin sedimentary aquifer, according to some embodiments. In some embodiments, one or more of the operations described below with reference to FIG. 2 may be performed or otherwise carried out by one or more components of the computer system 800.

As shown in FIG. 2, the NAT-EGS 200 can include a power plant 210 that includes a power generation unit, a pump system, and a well system disposed within a thin-bed HSA 206. In some embodiments, the thin-bed HSA 206 can be disposed above an impermeable rock 207.

The well system can include an extraction well 220 that enables the pump system to provide heated water at an extraction depth $D_E$ of the thin-bed HSA 206 to the power generation unit. The extraction well 220 can include a production element that includes an extraction pump, an extraction lateral 218 disposed within the thin-bed HSA 206 at the extraction depth $D_E$, and a vertical extraction component 219 extending between the extraction depth $D_E$ and the power generation unit.

The well system can further include an injection well 212 that enables the pump system to inject cooled water from the power generation unit into the thin-bed HSA 206 at an injection depth $D_I$. The injection well 212 can include an injection element that includes an injection pump, an injection lateral 214 disposed within the thin-bed HSA 206 at the injection depth $D_I$, and a vertical injection component 213 extending between the injection depth $D_I$ and the power generation unit.

In some embodiments, a horizontal distance 223 between the injection lateral 214 and the extraction lateral 218 can be equal to or greater than about 300 meters. In some aspects, the horizontal distance 223 between the extraction lateral 218 and the injection lateral 214 can be equal to or greater than about 500 meters. In some aspects, a thickness $T_{HSA}$ of the thin-bed HSA 206 can be equal to or less than about 100 meters, and a depth difference $\Delta D$ between the extraction depth $D_E$ and the injection depth $D_I$ (where $\Delta D=|D_I-D_E|$) can be equal to or less than about the thickness $T_{HSA}$ of the thin-bed HSA 206 (e.g., $\Delta D$ can be less than or equal to about 100 meters, 75 meters, 50 meters, 25 meters, 10 meters, etc.). In some aspects, the thickness $T_{HSA}$ of the thin-bed HSA 206 can be equal to or less than about 50 meters, and the depth difference $\Delta D$ between the extraction depth $D_E$ and the injection depth $D_I$ can be equal to or less than about the thickness $T_{HSA}$ of the thin-bed HSA 206 (e.g., $\Delta D$ can be less than or equal to about 50 meters, 40 meters, 30 meters, 20 meters, 10 meters, etc.). In some aspects, the depth difference $\Delta D$ may be determined according to the geothermal characteristics of the thin-bed HSA 206 and may be on the order of 100 m or less, as described herein.

As shown in FIG. 2, the wells both can be L-shaped in that the injection well 212 and the extraction well 220 each have vertical elements (e.g., vertical components) and horizontal elements (e.g., laterals). For example, the extraction well 220 may have a production element (e.g., which may include a vertical extraction component 219) that extends between the extraction depth $D_E$ and the surface 202 (and/or the power plant 210 on a surface 202 above the thin-bed HSA 206) and the extraction lateral 218 that is laterally drilled at the extraction depth $D_E$. The extraction lateral 218 (e.g., which may include a horizontal perforated pipe) may be mechanically coupled (e.g., physically attached to, physically fastened to, fluidly coupled, and/or the like) to the production element. Accordingly, the extraction lateral 218 may laterally branch out from the production element at the extraction depth $D_E$. Furthermore, the injection well 212 may have the injection element that extends between the injection depth $D_I$ and the surface 202 and the injection lateral 214. The injection lateral 214 may be mechanically coupled to the injection element, and laterally branch out from the injection element at the injection depth $D_I$. The extraction lateral 218 and the injection lateral 214 can be substantially parallel (e.g., within an industry standard threshold of parallel) to one another and substantially vertically aligned (e.g., within an industry standard threshold of vertical). Accordingly, a substantially horizontal heat zone aligned with the induced natural lateral flow of hot water (e.g., as indicated by the reference arrow 250) can be formed within the thin-bed HSA 206 between the extraction lateral 218 and the injection lateral 214.

In some embodiments, as shown in FIG. 2, the injection depth $D_I$ can be substantially the same as the extraction depth $D_E$. In other embodiments, the injection depth $D_I$ can be substantially deeper than the extraction depth $D_E$. In still other embodiments, depending upon the terrain, the extraction depth $D_E$ can be deeper than the injection depth $D_I$. In such embodiments where the depth difference $\Delta D$ between the extraction depth $D_E$ and the injection depth $D_I$ is substantially non-zero, the configuration of the injection well 212 and the extraction well 220 (which may be referred to collectively herein as "the wells") can be "disjointed" in that the wells can be drilled to different depths substantially without creating manmade fractures or openings directly connecting the wells (e.g., between the extraction lateral 218 of the extraction well 220 and the injection lateral 214 of the injection well 212). For example, the terrain of the thin-bed HSA 206 between the injection well 212 and extraction well 220 can have a sufficient permeability to create a substantially uninhibited lateral flow of water between the wells, as indicated by reference arrow 250.

In some embodiments as shown in FIG. 1, when the thickness of the HSA 106 is adequately thick, the extraction lateral 118 and the injection lateral 114 can be located vertically above one another at the bottom (e.g., injection well 112) and top (e.g., extraction well 120) of the HSA 106 without lateral offsetting. In contrast, in some embodiments as shown in FIG. 2, when the sedimentary layer is thin (e.g., the thickness $T_{HSA}$ of the thin-bed HSA 206 is not adequately thick), the extraction lateral 218 and the injection lateral 214 can be located horizontally offset from each other (e.g., horizontal distance 223 can be non-zero). Such a geometrical setting can generate a fluid convection or recirculation system within the thin-bed HSA 206.

Referring again to FIG. 2, the well system can further include a regulatory device configured to generate a first control signal configured to instruct the pump system to pump the heated water, from the extraction well 220, to the power generation unit. In some embodiments, the first control signal can be further configured to instruct the pump system to pump, via the extraction well 220, the heated water from the extraction depth $D_E$ of the thin-bed HSA 206 at an extraction rate that stimulates a flow field that provides a recharge of the extracted heat. The regulatory device can be further configured to generate a second control signal configured to instruct the power generation unit to extract thermal energy from the heated water and to transform the heated water into cooled water. The regulatory device can be further configured to generate a third control signal configured to instruct the pump system to pump the cooled water from the power generation unit to the injection well 212.

In some embodiments, the third control signal can be further configured to instruct the pump system to inject the cooled water with a supplemental agent to enhance a permeability, a porosity, or both of the thin-bed HSA 206. In such embodiments, the permeability may not satisfy a threshold permeability range before an injection of the cooled water with the supplemental agent, and the permeability can satisfy the threshold permeability range after the injection of the cooled water with the supplemental agent. In some embodiments, the supplemental agent can include materials including, but not limited to, a muriatic acid, a hydrochloric acid, and/or any other materials and methods to enhance the permeability of the thin-bed HSA 206. In other embodiments, the supplemental agent can include an energetic or propellant-based agent, including, but not limited to, an ignitable solid or liquid fuel and/or any other materials and methods to enhance the permeability of the thin-bed HSA 206.

As shown by magnified view 270, the thin-bed HSA 206 may include a plurality of channels that permit water within the thin-bed HSA 206 to flow through the thin-bed HSA 206 from the injection well 212 to the extraction well 220, as shown by reference arrow 250. During operation, the injection well 212 can be used to release a certain amount of cooled water at the injection depth $D_I$ in a region of the thin-bed HSA 206, and the extraction well 220 can be used to harvest heated water in another region of the thin-bed HSA 206. Accordingly, as indicated by hot/cold scale 260 and the shading of channels shown in magnified view 270 of the thin-bed HSA 206, the temperature of the water flowing laterally between in the injection well 212 and the extraction well 220 can be relatively cooler toward the injection well 212 and relatively warmer toward the extraction well 220 due to the configuration of the NAT-EGS 200 and geothermal characteristics of the thin-bed HSA 206. Correspondingly, as illustrated by the shading of the reference arrow 250, the water in the thin-bed HSA 206 can be heated as the water permeates or flows laterally from the injection depth $D_I$ to the extraction depth $D_E$.

Using the NAT-EGS 200, water can be cycled through the thin-bed HSA 206. For example, injected cooled water in a first region of the thin-bed HSA 206 can be exposed to heated material (e.g., sand, rocks, and/or the like) and heated water within the thin-bed HSA 206. More specifically, as the cooled water traverses or is infused within the thin-bed HSA 206, the cooled water is warmed via conduction, convection, advection, or a combination thereof. As heated water is pumped from the extraction well 220 in a second region of the thin-bed HSA 206, the injected water permeates laterally to replace the extracted water. As the energy or heat is harvested from the extracted water, which is now relatively cooler, the cooled water is then reinjected into the first region of the thin-bed HSA 206 via the injection well 212. That cooled water can again be heated and migrates laterally, mingling with other waters eventually to be harvested throughout one or more cycles. By this technique, a large-scale convective or circulation system can be established within the greater surrounding thin-bed HSA 206 environment between the extraction well 220, the power plant 210, the injection well 212, and the thin-bed HSA 206. As a result, in the NAT-EGS 200, heat is provided mainly by widespread, natural advection or convection of super-heated water in the deep sedimentary aquifer over a volume of thin-bed HSA 206 material surrounding the specific wells and thus a longer (e.g., greater than 50 years) and more continuous production of energy can be maintained substantially without the potential of environmental hazard (e.g., from fracking techniques).

In some embodiments, the NAT-EGS 200 may have a longer useful life (e.g., over 50 years or more) due to the geothermal characteristics of the thin-bed HSA 206 (many of which are located throughout the Earth). Further, the NAT-EGS 200 may be substantially maintenance free during the extended duration and useful life of the NAT-EGS 200 because the heat source (e.g., the thin-bed HSA 206) does not have to be maintained (e.g., no fractures may need to be cleared of debris and/or reopened to maintain a desired flow if the fractures collapse). Moreover, within the source volume of the thin-bed HSA 206 laterally between the drill holes there are no pipes or artificial or manufactured pathways that may need maintenance.

In some embodiments, the NAT-EGS 200 can provide a large-scale recharge of the thin-bed HSA 206 via circulatory movement of water and heat through the thin-bed HSA 206 that is induced by the pressure field and temperature gradient associated with pumping water from the extraction well 220 and back into the thin-bed HSA 206 via the injection well 212. For example, water from areas that are not within regions surrounding the wells can be pulled into the heat zone between the wells via the circulatory movement. Thus, water in regions of the thin-bed HSA 206 around the wells can continuously and naturally be reheated by the higher temperature of sedimentary rocks throughout the thin-bed HSA 206. Furthermore, a combined effect of heated, low density water being extracted from one region of the thin-bed HSA 206, and cooled denser water, having been run through the power plant, being injected into another region of the thin-bed HSA 206 functions, in effect, as a thermal flywheel to sustain the circulation.

Figure 3:
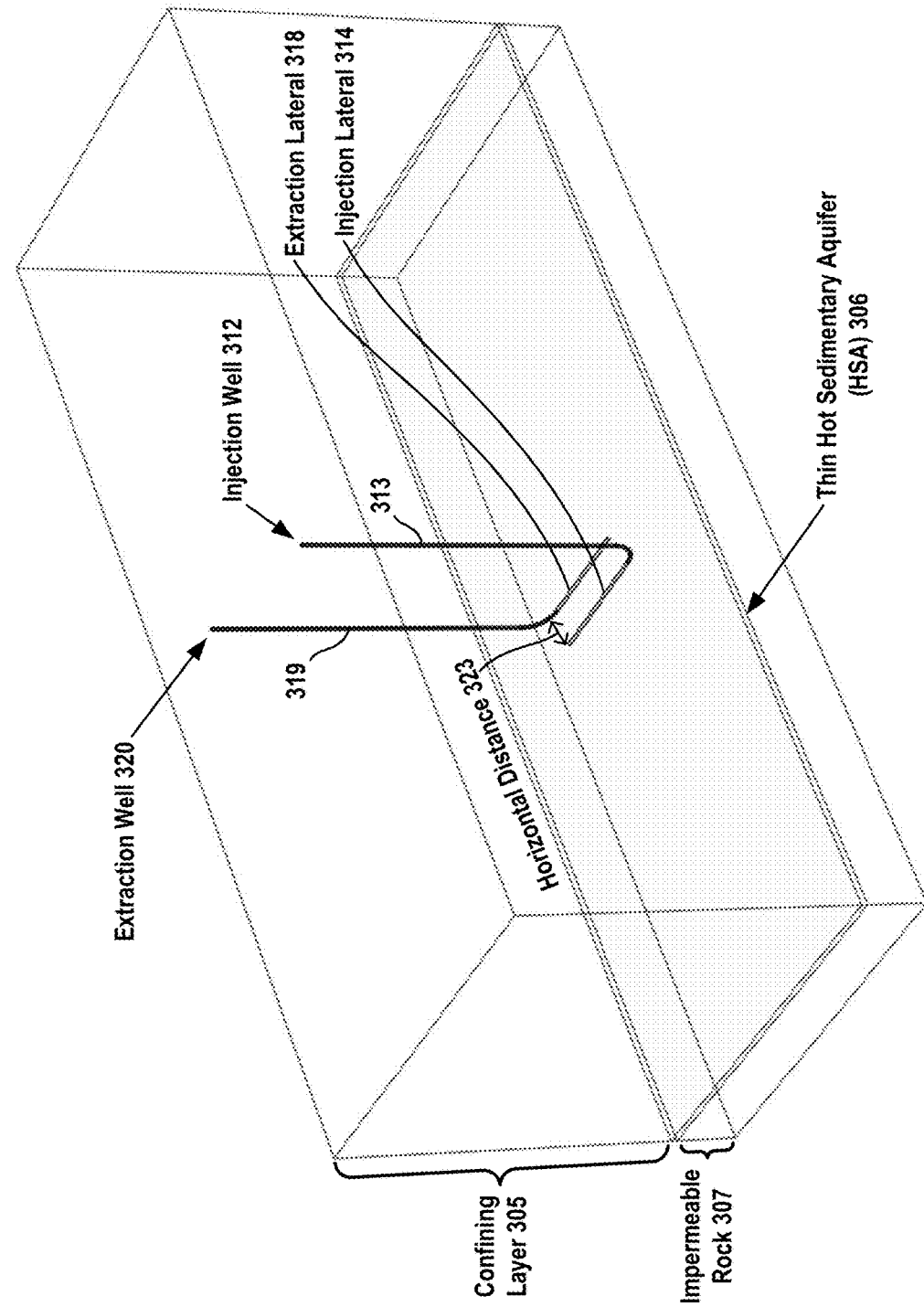
FIG. 3 is a schematic diagram of an example numerical simulation domain of an example NAT-EGS, according to some embodiments.

FIG. 3 illustrates an example numerical modeling domain (e.g., various geologic layers, well configuration and distancing, etc.) that has been used to simulate the full operation of an example NAT-EGS 300, according to some embodiments. In some embodiments, one or more of the operations described below with reference to FIG. 3 may be performed or otherwise carried out by one or more components of the computer system 800.

As shown in FIG. 3, the NAT-EGS 300 can include an extraction well 320 having a production element that includes an extraction pump, a vertical extraction component 319, and an extraction lateral 318 laterally drilled at an extraction depth and disposed within a thin-bed HSA 306. NAT-EGS 300 can further include an injection well 312 having an injection element that includes an injection pump, a vertical injection component 313, and an injection lateral 314 laterally drilled at an injection depth and disposed within the thin-bed HSA 306. The thin-bed HSA 306 can be disposed below a confining layer 305 and above an impermeable rock 307. The geophysical characteristics of each of the confining layer 305, the thin-bed HSA 306 and the impermeable rock 307 have been determined via geologic data analysis including direct drilling.

In the example numerical modeling domain, the thin-bed HSA 306 is relatively thin, about 50 meters, and located at a depth of about 2800 meters below the surface. The pumping system that controls the extraction of hot water and re-injection of cooled water is controlled on the surface. The horizontal distance 323 between the extraction lateral 318 and the injection lateral 314 (e.g., well spacing) has an important impact on the efficiency and longevity of the NAT-EGS 300 and may be different from case to case, not necessarily parallel to one another, and distinctly crafted to each specific geologic situation.

FIG. 4 illustrates the results of an example numerical simulation of the full operation of an example NAT-EGS 400 utilizing the example numerical modeling domain described with reference to FIG. 3, according to some embodiments. In some embodiments, one or more of the operations described below with reference to FIG. 4 may be performed or otherwise carried out by one or more components of the computer system 800.

As shown in FIG. 4, the NAT-EGS 400 can include an extraction well 420 having a production element that includes an extraction pump, a vertical extraction component 419, and an extraction lateral 418 laterally drilled at an extraction depth and disposed within a thin-bed HSA 406. NAT-EGS 400 can further include an injection well 412 having an injection element that includes an injection pump, a vertical injection component 413, and an injection lateral 414 laterally drilled at an injection depth and disposed within the thin-bed HSA 406. The thin-bed HSA 406 can be disposed below a confining layer 405 and above an impermeable rock 407. The geophysical characteristics of each of the confining layer 405, the thin-bed HSA 406 and the impermeable rock 407 have been determined via geologic data analysis.

As shown in FIG. 4, the results of the example numerical simulation of the full operation of the example NAT-EGS 400 show a convective recirculation cell 450 induced within the thin-bed HSA 406. In this numerical simulation, the thin-bed HSA 406 was about 50 meters and located at a depth of about 2800 meters below the surface, the extraction well 420 and the injection well 412 were parallel to each other, and the horizontal distance 423 between the extraction lateral 418 and the injection lateral 414 was 300 meters. Due to a dipolar pumping pressure, the convective recirculation cell 450 was formed which caused an aquifer-wide mixing of the injected water and existing water. Such convection caused recharging of the system and increased the longevity of the NAT-EGS 400. The arrows and lines in the convective recirculation cell 450 were calculated (e.g., extrapolated) values and showed that the flow field was still operating after 20 years.

Figure 5:
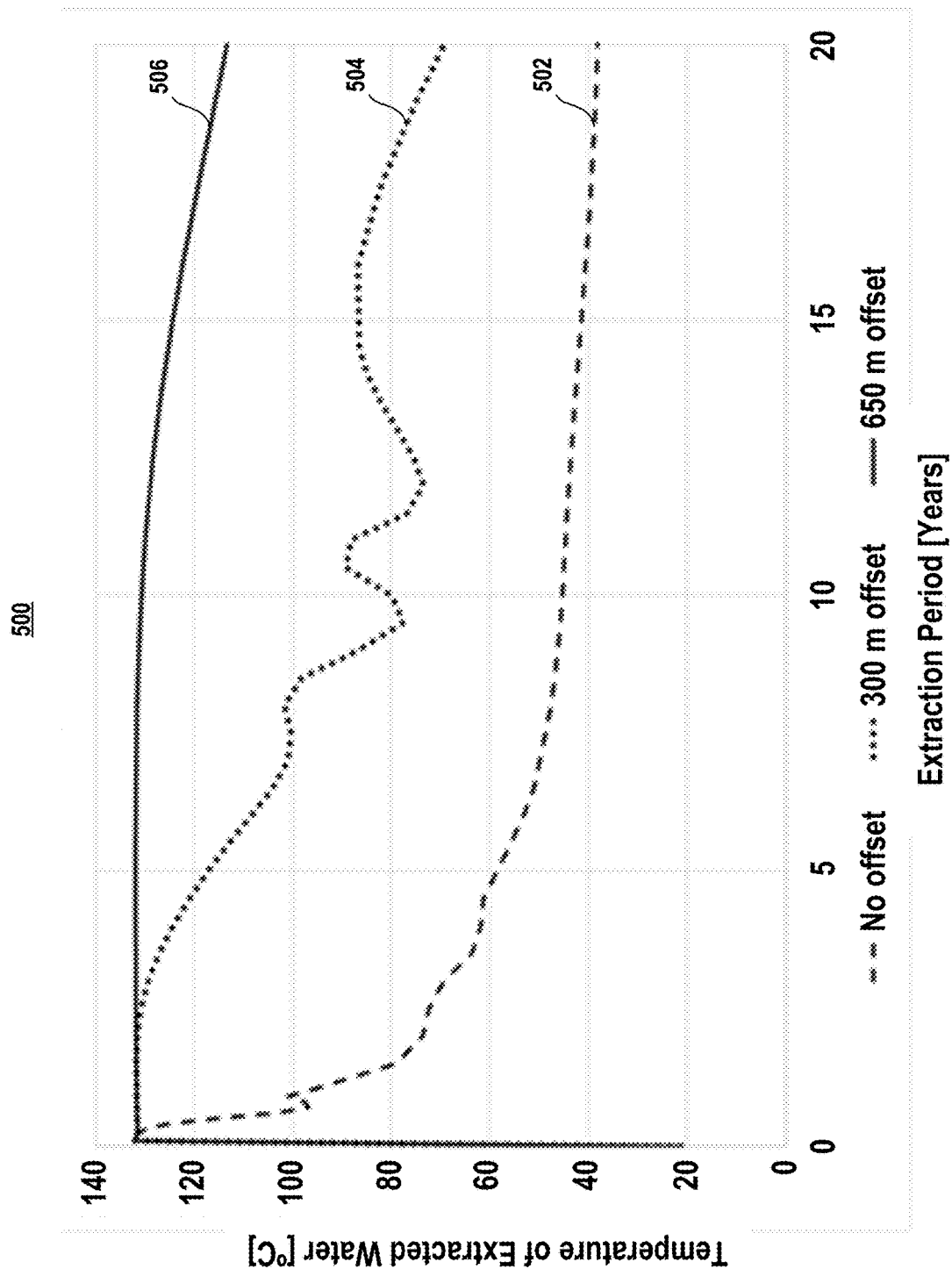
FIG. 5 shows an example graph associated with an example geothermal convective power cell process according to some aspects of the present disclosure.

FIG. 5 shows an example graph 500 that demonstrates the impact of changing the spacing between the extraction and injection wells on the temperature of the extracted water in an example GPC process, according to some aspects of the present disclosure. In some embodiments, one or more of the operations described below with reference to FIG. 5 may be performed or otherwise carried out by one or more components of the computer system 800.

In some embodiments, determining the optimum offset spacing between the injection and extraction wells can improve the operation of the GPC because: (i) if the distance is too short, a quick chilling or short-circuiting of the geothermal system occurs; (ii) if the injection and extraction wells are too distant, a substantially large amount of pumping pressure is required and, additionally, the geologic setting might change undesirably over a larger scale. Accordingly, by using the state of the art finite element modeling, an optimum configuration of the injection and extraction wells can be fully determined for the most economic harvesting of Geothermal Energy.

As shown in FIG. 5, the example graph 500 illustrates the variation of the temperature of the extracted water over a period of 20 years as found in numerical simulations for three geometric configurations or offsets of the respective laterals of the extraction and injection wells: a no offset curve 502 (e.g., horizontal distance 223 between the injection lateral 214 and the extraction lateral 218=0 m); a 300 meter offset curve 504 (e.g., horizontal distance 223=300 m); and a 650 meter offset curve 506 (e.g., horizontal distance 223=650 m). As the horizontal separation between the extraction and injection laterals increases, the cooling of the sedimentary aquifer is increasingly delayed with the result that the geothermal energy system is economically efficient for an increasingly long duration.

Example Method for Configuring a Geothermal System

FIG. 6 is a flowchart for a method 600 for configuring a geothermal system, according to an embodiment. Method 600 can be performed by processing logic that can include hardware (e.g., circuitry, dedicated logic, programmable logic, microcode, etc.), software (e.g., instructions executing on a computing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIG. 2. However, method 600 is not limited to those example embodiments.

In 602, the method 600 includes determining, according to a geothermal characteristic of a thin-bed HSA 206 below a surface 202 location that satisfies a threshold associated with providing geothermal energy, an extraction depth $D_E$ for an extraction well 220 disposed to extract heated water from the thin-bed HSA 206. In 602, the method 600 further includes determining, according to the geothermal characteristic, an injection depth $D_I$ for an injection well 212 disposed to inject cooled water into the thin-bed HSA 206 that is generated from a heat extraction process (e.g., performed by the power plant 210) associated with capturing geothermal energy. A thickness of the thin-bed HSA 206 can be equal to or less than about 100 meters, and a first portion of the extraction well 220 and a second portion of the injection well 212 can be disposed within the thin-bed HSA 206. In some embodiments, a depth difference $\Delta D$ between the injection depth $D_I$ and the extraction depth $D_E$ can be based on the geothermal characteristic. In some embodiments, the depth difference $\Delta D$ between the injection depth $D_I$ and the extraction depth $D_E$ can be equal to or less than about the thickness $T_{HSA}$ of the thin-bed HSA 206.

In some embodiments, the first portion of the extraction well 220 can include the extraction lateral 218, the second portion of the injection well 212 can include the injection lateral 214. In some embodiments, the horizontal distance 223 between the extraction lateral 218 and the injection lateral 214 can be equal to or greater than about 300 meters.

In some embodiments, determining the geothermal characteristic that satisfies the threshold can include determining an induced heat flow that satisfies a heat flow threshold associated with providing the geothermal energy. In some embodiments, determining that the geothermal characteristic satisfies the threshold can include determining that a temperature of the thin-bed HSA 206 at the extraction depth $D_E$ is at least 120 degrees Celsius.

In 604, the method 600 includes configuring the NAT-EGS 200 to extract the heated water from the thin-bed HSA 206 at the extraction depth $D_E$. Optionally, the method 600 can further include configuring the NAT-EGS 200 to pump, via the extraction well 220, the heated water from the extraction depth $D_E$ at an extraction rate that stimulates a flow field that provides a recharge of the extracted heat.

In 606, the method 600 includes configuring the NAT-EGS 200 to inject cooled water into the thin-bed HSA 206 at the injection depth $D_I$. In some embodiments, the configuring the NAT-EGS 200 to inject the cooled water can include configuring the NAT-EGS 200 to inject the cooled water with a supplemental agent to enhance a permeability of the thin-bed HSA 206. In such embodiments, before an injection of the cooled water with the supplemental agent, the permeability does not satisfy a threshold permeability range; and after the injection of the cooled water with the supplemental agent, the permeability satisfies the threshold permeability range. In one example, the supplemental agent can include, for example, such materials as or similar to a muriatic acid or hydrochloric acid. In another example, the supplemental agent can include an energetic or propellant-based agent, including, but not limited to, an ignitable solid or liquid fuel and/or any other materials and methods to enhance the permeability of the thin-bed HSA 206.

Optionally, the method 600 can further include determining a flow characteristic of the thin-bed HSA 206. Optionally, the method 600 can further include determining, based on the extraction depth $D_E$, the injection depth $D_I$, and the flow characteristic, a water flow rate associated with extracting the heated water via the extraction well 220 or injecting the cooled water via the injection well 212. Optionally, the method 600 can further include configuring the NAT-EGS 200 to extract the heated water or inject the cooled water at the water flow rate.

Example Method for Harvesting Heat from a Thin-Bed Hot Sedimentary Aquifer

FIG. 7 is a flowchart for a method 700 for harvesting heat from a thin-bed HSA, according to an embodiment. Method 700 can be performed by processing logic that can include hardware (e.g., circuitry, dedicated logic, programmable logic, microcode, etc.), software (e.g., instructions executing on a computing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

Method 700 shall be described with reference to FIG. 2. However, method 700 is not limited to those example embodiments.

In 702, the method 700 includes pumping, via an extraction well 220, heated water from an extraction depth $D_E$ of a thin-bed HSA 206. The thin-bed HSA 206 can be identified based on a permeability (e.g., bulk permeability) satisfying a threshold permeability range. A thickness of the thin-bed HSA 206 can be equal to or less than about 100 meters. In some embodiments, the permeability can be a bulk permeability determined according to an analysis of geologic data associated with the thin-bed HSA 206 which ultimately will allow for sufficient pumping of the heated water to generate geothermal power.

In some embodiments, the pumping the heated water can include pumping the heated water via a production element and an extraction lateral 218 of the extraction well 220. The production element can include an extraction pump and a vertical extraction component 219 extending between the extraction depth $D_E$ and the power generation unit. The extraction lateral 218 can be mechanically coupled to the production element and include one or more lateral production branches that extend from the production element at the extraction depth $D_E$.

In 704, the method 700 includes extracting, via a power generation unit of a power plant 210, heat from the heated water to generate power and transform the heated water into cooled water.

In 706, the method 700 includes injecting, via an injection well 212, the cooled water at an injection depth $D_I$ of the thin-bed HSA 206. A first portion of the extraction well 220 and a second portion of the injection well 212 can be disposed within the thin-bed HSA 206. The first portion of the extraction well 220 can include an extraction lateral 218. The second portion of the injection well 212 can include an injection lateral 214. A horizontal distance between the extraction lateral 218 and the injection lateral 214 can be equal to or greater than about 300 meters. In some embodiments, the pumping the heated water can include pumping, via the extraction well 220, the heated water from the extraction depth $D_E$ of the thin-bed HSA 206 at an extraction rate that stimulates a flow field that provides a recharge of the extracted heat (e.g., to provide a decades-long longevity of the extracted heat for geothermal power generation). In some embodiments, a depth difference $\Delta D$ between the extraction depth $D_E$ and the injection depth $D_I$ can be equal to or less than about the thickness $T_{HSA}$ of the thin-bed HSA 206. For example, the depth difference $\Delta D$ can be equal to or less than about the thickness $T_{HSA}$ of the thin-bed HSA 206.

In some embodiments, the injecting of the cooled water can include injecting the cooled water via an injection element and an injection lateral 214 of the injection well 212. The injection element can include an injection pump and a vertical injection component 213 extending between the injection depth $D_I$ and the power generation unit. The injection lateral 214 can be mechanically coupled to the injection element and can include one or more lateral injection branches that extend from the injection element at the injection depth $D_I$.

In some embodiments, the injecting of the cooled water can include injecting, via the injection well 212, the cooled water with a supplemental agent to enhance the permeability of the thin-bed HSA 206. The supplemental agent can include, for example, such materials as or similar to a muriatic acid, a hydrochloric acid, or an energetic or propellant-based agent (e.g., solid or liquid fuel). In such embodiments, before the injecting the cooled water with the supplemental agent, the permeability does not satisfy the threshold permeability range; and after the injecting the cooled water with the supplemental agent, the permeability satisfies the threshold permeability range.

Example Computer System

Figure 8:
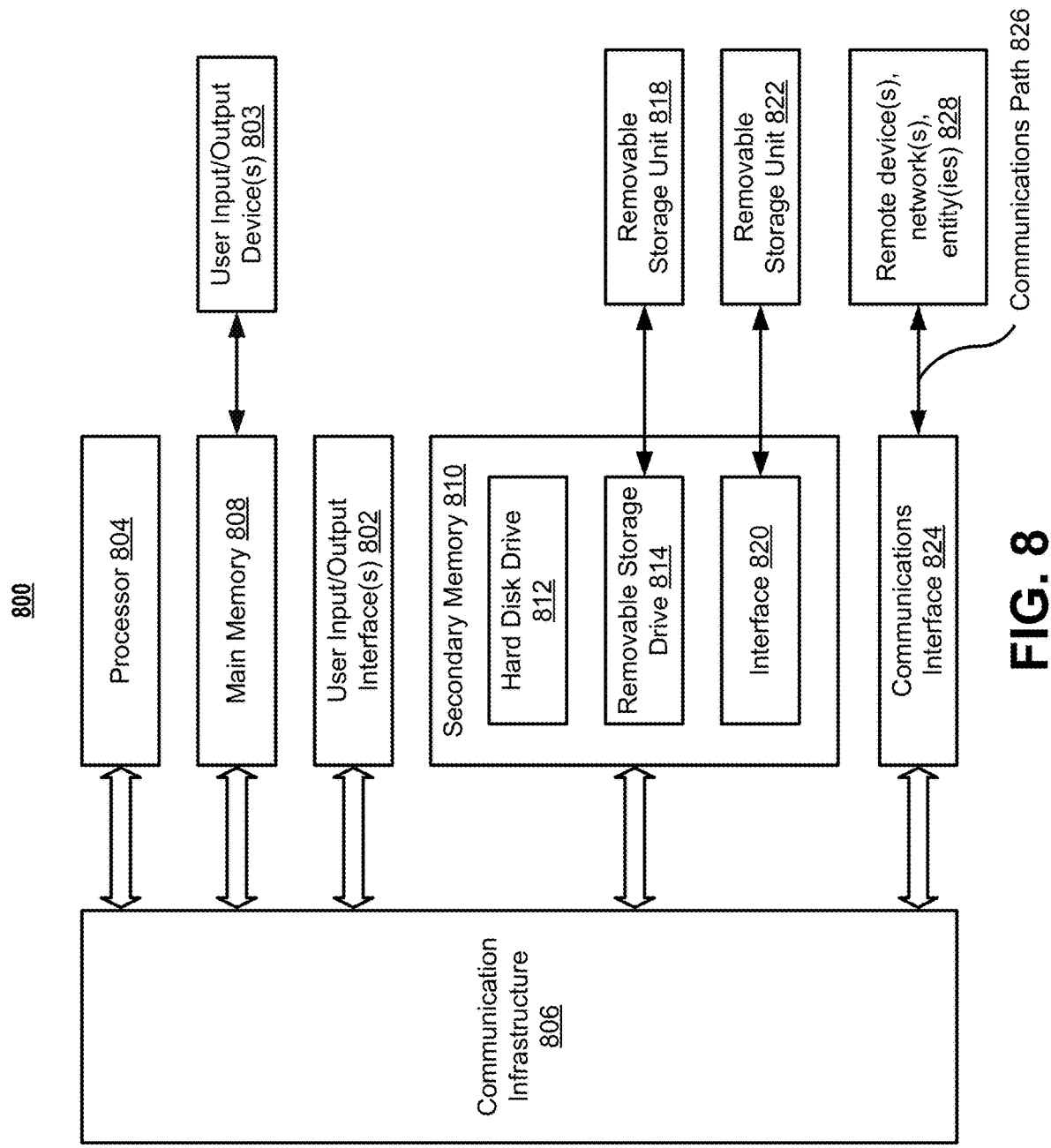
FIG. 8 illustrates an example computer system for implementing various embodiments.

Various embodiments of this disclosure may be implemented, for example, using one or more computer systems, such as computer system 800 shown in FIG. 8. For example, the systems, devices, components, and/or structures disclosed herein may be implemented using combinations or sub-combinations of computer system 800. Additionally or alternatively, computer system 800 can include one or more computer systems that may be used, for example, to implement any of the embodiments discussed herein, as well as combinations and sub-combinations thereof. It is noted, however, that the computer system 800 is provided solely for illustrative purposes, and is not limiting. Embodiments of this disclosure may be implemented using and/or may be part of environments different from and/or in addition to the computer system 800, as will be appreciated by persons skilled in the relevant art(s) based on the teachings contained herein. An example of the computer system 800 shall now be described.

Computer system 800 may include one or more processors (also called central processing units, or CPUs), such as one or more processors 804. In some embodiments, one or more processors 804 may be connected to a communications infrastructure 806 (e.g., a bus).

Computer system 800 may also include user input/output device(s) 803, such as monitors, keyboards, pointing devices, etc., which may communicate with communications infrastructure 806 through user input/output interface(s) 802.

One or more of the one or more processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main memory 808 (e.g., a primary memory or storage device), such as random access memory (RAM). Main memory 808 may include one or more levels of cache. Main memory 808 may have stored therein control logic (e.g., computer software) and/or data.

Computer system 800 may also include one or more secondary storage devices or memories such as secondary memory 810. Secondary memory 810 may include, for example, a hard disk drive 812, a removable storage drive 814 (e.g., a removable storage device), or both. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer usable or readable storage device having stored thereon computer software (e.g., control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 800 may further include a communications interface 824 (e.g., a network interface). Communications interface 824 may enable computer system 800 to communicate and interact with any combination of external devices, external networks, external entities, etc. (individually and collectively referenced by reference number 828). For example, communications interface 824 may allow computer system 800 to communicate with external devices 828 (e.g., remote devices) over communications path 826, which may be wired and/or wireless (or a combination thereof), and which may include any combination of LANs, WANs, the Internet, etc. Control logic and/or data may be transmitted to and from computer system 800 via communications path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture including a tangible, non-transitory computer useable or readable medium having control logic (software) stored thereon may also be referred to herein as a computer program product or program storage device. This includes, but is not limited to, computer system 800, main memory 808, secondary memory 810, removable storage unit 818, and removable storage unit 822, as well as tangible articles of manufacture embodying any combination of the foregoing. Such control logic, when executed by one or more data processing devices (e.g., one or more computing devices, such as the computer system 800 or the one or more processors 804), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all example embodiments as contemplated by the inventors, and thus, are not intended to limit this disclosure or the appended claims in any way.

While this disclosure describes example embodiments for example fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments, but should be defined only in accordance with the following claims and their equivalents.

What is claimed is:

1. A method comprising:
    pumping, via an extraction well, heated water from an extraction depth of a hot sedimentary aquifer (HSA);
    extracting, via a power generation unit, heat from the heated water to generate power and transform the heated water into cooled water; and
    injecting, via an injection well offset from the extraction well by a first horizontal distance, the cooled water at an injection depth of the HSA,
    wherein:
    the HSA is identified based on a permeability of the HSA satisfying a threshold permeability range,
    a thickness of the HSA is equal to or less than about 100 meters, and
    a first portion of the extraction well and a second portion of the injection well are disposed within the HSA,
    wherein the first portion of the extraction well comprises an extraction lateral extending horizontally and the second portion of the injection well comprises an injection lateral extending parallel to and offset from the extraction lateral by a horizontal distance, such that the injection lateral and the extraction lateral are configured to induce a convective recirculation cell within the HSA.

2. The method of claim 1, wherein the pumping the heated water comprises pumping, via the extraction well, the heated water from the extraction depth of the HSA at an extraction rate that stimulates a flow field that provides a recharge of the extracted heat.

3. The method of claim 1, wherein the permeability of the HSA is a bulk permeability of the HSA determined according to an analysis of geologic data associated with the HSA to allow for sufficient pumping of the heated water to generate the power.

4. The method of claim 1, wherein a depth difference between the extraction depth and the injection depth is equal to or less than about the thickness of the HSA.

5. The method of claim 1, wherein:
    the pumping the heated water comprises pumping the heated water via a production element and the extraction lateral of the extraction well;
    the production element comprises an extraction pump and a vertical extraction component extending between the extraction depth and the power generation unit; and
    the extraction lateral is mechanically coupled to the production element and comprises one or more lateral production branches that extend from the production element at the extraction depth.

6. The method of claim 1, wherein:
the injecting the cooled water comprises injecting the cooled water via an injection element and the injection lateral of the injection well;
the injection element comprises an injection pump and a vertical injection component extending between the injection depth and the power generation unit; and
the injection lateral is mechanically coupled to the injection element and comprises one or more lateral injection branches that extend from the injection element at the injection depth.

7. The method of claim 1, wherein the injecting the cooled water comprises:
injecting, via the injection well, the cooled water with a supplemental agent to enhance the permeability of the HSA,
wherein:
before the injecting the cooled water with the supplemental agent, the permeability of the HSA does not satisfy the threshold permeability range; and
after the injecting the cooled water with the supplemental agent, the permeability of the HSA satisfies the threshold permeability range.

8. The method of claim 7, wherein the supplemental agent comprises a material selected from the group consisting of a muriatic acid, a hydrochloric acid, and a propellant-based agent.

9. A method comprising:
determining, according to a geothermal characteristic of a hot sedimentary aquifer (HSA) below a surface location that satisfies a threshold associated with providing geothermal energy, an extraction depth for an extraction well disposed to extract heated water from the HSA and an injection depth for an injection well disposed to inject cooled water into the HSA that is generated from a heat extraction process associated with capturing geothermal energy;
configuring a geothermal system in association with the surface location to extract the heated water from the HSA at the extraction depth; and
configuring the geothermal system to inject cooled water into the HSA at the injection depth,
wherein:
a thickness of the HSA is equal to or less than about 100 meters, and
the extraction well and the injection well are offset by a first horizontal distance, a first portion of the extraction well and a second portion of the injection well are disposed within the HSA,
wherein the first portion of the extraction well comprises an extraction lateral extending horizontally and the second portion of the injection well comprises an injection lateral extending parallel to and offset from the extraction lateral by a horizontal distance, such that the injection lateral and the extraction lateral are configured to induce a convective recirculation cell within the HSA.

10. The method of claim 9, further comprising configuring the geothermal system to pump, via the extraction well, the heated water from the extraction depth of the HSA at an extraction rate that stimulates a flow field that provides a recharge of the extracted heat.

11. The method of claim 9, wherein determining that the geothermal characteristic satisfies the threshold comprises:
determining that an induced heat flow satisfies a heat flow threshold associated with providing the geothermal energy.

12. The method of claim 9, wherein a depth difference between the injection depth and the extraction depth is based on the geothermal characteristic.

13. The method of claim 9, wherein a depth difference between the extraction depth and the injection depth is equal to or less than about the thickness of the HSA.

14. The method of claim 9, wherein determining that the geothermal characteristic satisfies the threshold comprises determining that a temperature of the HSA at the extraction depth is at least 120 degrees Celsius.

15. The method of claim 9, further comprising:
determining a flow characteristic of the HSA;
determining, based on the extraction depth, the injection depth, and the flow characteristic, a water flow rate associated with extracting the heated water via the extraction well or injecting the cooled water via the injection well; and
configuring the geothermal system to extract the heated water or inject the cooled water at the water flow rate.

16. The method of claim 9, wherein the configuring the geothermal system to inject the cooled water comprises:
configuring the geothermal system to inject the cooled water with a supplemental agent to enhance a permeability of the HSA,
wherein:
before an injection of the cooled water with the supplemental agent, the permeability of the HSA does not satisfy a threshold permeability range; and
after the injection of the cooled water with the supplemental agent, the permeability of the HSA satisfies the threshold permeability range.

17. The method of claim 16, wherein the supplemental agent comprises a material selected from the group consisting of a muriatic acid, a hydrochloric acid, and a propellant-based agent.

18. A geothermal system comprising:
a power generation unit;
a pump system;
a well system disposed within a hot sedimentary aquifer (HSA), wherein the well system comprises:
an extraction well that enables the pump system to provide heated water at an extraction depth of the HSA to the power generation unit, and
an injection well that enables the pump system to inject cooled water from the power generation unit into the HSA at an injection depth, wherein a thickness of the HSA is equal to or less than about 100 meters, and wherein a first portion of the extraction well and a second portion of the injection well are disposed within the HSA,
wherein the first portion of the extraction well comprises an extraction lateral extending horizontally and the second portion of the injection well comprises an injection lateral extending parallel to and offset from the extraction lateral by a horizontal distance, such that the injection lateral and the extraction lateral are configured to induce a convective recirculation cell within the HSA; and
a regulatory device configured to:
generate a first control signal configured to instruct the pump system to pump the heated water, from the extraction well, to the power generation unit;
generate a second control signal configured to instruct the power generation unit to extract thermal energy from the heated water and to transform the heated water into cooled water; and generate a third control signal configured to instruct the pump system to pump the cooled water from the power generation unit to the injection well.

19. The geothermal system of claim 18, wherein the first control signal is further configured to instruct the pump system to pump, via the extraction well, the heated water from the extraction depth of the HSA at an extraction rate that stimulates a flow field that provides a recharge of the extracted heat.

20. The geothermal system of claim 18, wherein a depth difference between the extraction depth and the injection depth is equal to or less than about the thickness of the HSA.

21. The geothermal system of claim 18, wherein:
the thickness of the HSA is equal to or less than about 50 meters; and
a depth difference between the extraction depth and the injection depth is equal to or less than about the thickness of the HSA.

22. The geothermal system of claim 18, wherein the horizontal distance between the extraction lateral and the injection lateral is equal to or greater than about 500 meters.

23. The geothermal system of claim 18, wherein the injection depth is deeper than the extraction depth.

24. The geothermal system of claim 18, wherein:
the third control signal is further configured to instruct the pump system to inject the cooled water with a supplemental agent to enhance a permeability of the HSA;
before an injection of the cooled water with the supplemental agent, the permeability of the HSA does not satisfy a threshold permeability range; and
after the injection of the cooled water with the supplemental agent, the permeability of the HSA satisfies the threshold permeability range.

25. The geothermal system of claim 24, wherein the supplemental agent comprises a material selected from the group consisting of a muriatic acid, a hydrochloric acid, and a propellant-based agent.

* * * * *